United States Patent [19]

Hunter

[11] 4,379,672
[45] Apr. 12, 1983

[54] COMBINATION HANDLING AND CONVEYING APPARATUS

[76] Inventor: Roy D. Hunter, 2829 Texas Ave., Texas City, Tex. 77590

[21] Appl. No.: 148,822

[22] Filed: May 12, 1980

[51] Int. Cl.³ .................. B65G 41/00; B65G 65/04; B65G 67/60
[52] U.S. Cl. .................. 414/565; 198/517; 198/316; 198/863; 414/133; 414/139; 414/567
[58] Field of Search ............. 414/137, 133, 139, 565, 414/567; 198/517, 316, 318, 311, 863

[56] References Cited

U.S. PATENT DOCUMENTS

| | | | |
|---|---|---|---|
| 1,943,869 | 1/1934 | Kendall | 198/863 |
| 2,805,750 | 9/1957 | MacDonald | 198/316 X |
| 2,805,759 | 9/1957 | Manceau | 198/316 X |
| 3,095,080 | 6/1963 | Wagner | 198/316 X |
| 3,387,721 | 6/1968 | Ludwig | 198/863 X |
| 4,011,936 | 3/1977 | Hall | 198/517 |
| 4,082,181 | 4/1981 | Berthold | 198/863 |
| 4,184,581 | 1/1980 | Crawshay | 198/318 X |

Primary Examiner—Robert J. Spar
Assistant Examiner—Terrance L. Siemens
Attorney, Agent, or Firm—Darryl M. Springs

[57] ABSTRACT

In one exemplary embodiment, an apparatus for handling and conveying materials is disclosed having a movable chassis, a longitudinally extendable conveyor assembly mounted on the chassis, the conveyor having a projecting loading end capable of limited longitudinal and arcuate vertical movement to a position immediately adjacent the location of the material being handled. An articulated boom assembly is rotatably mounted on the chassis with the movable free end carrying a pushing and pulling blade for loading the material unto the loading end of the conveyor.

12 Claims, 15 Drawing Figures

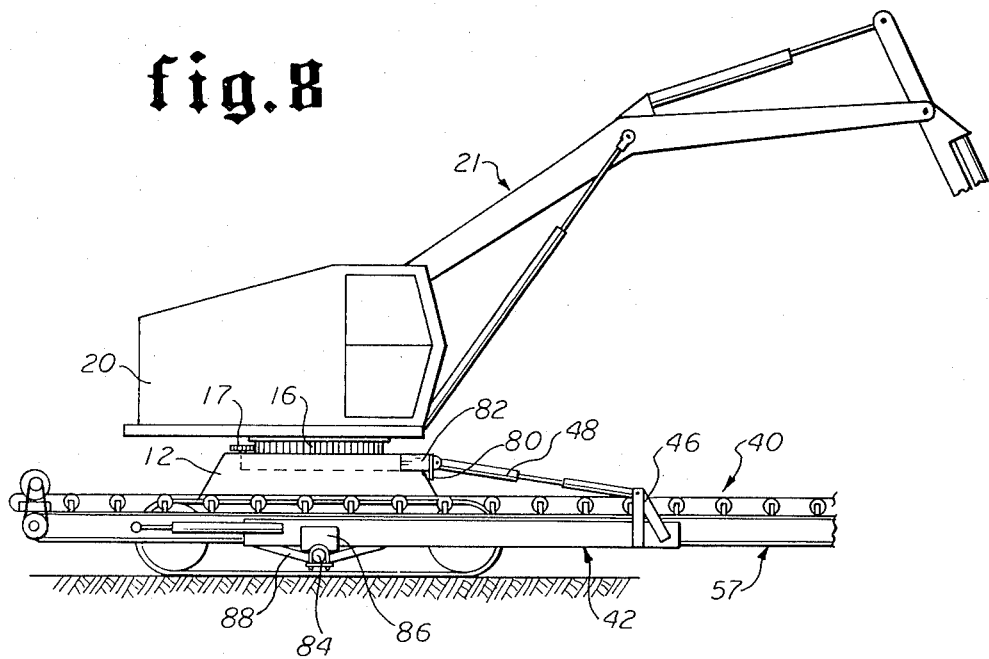
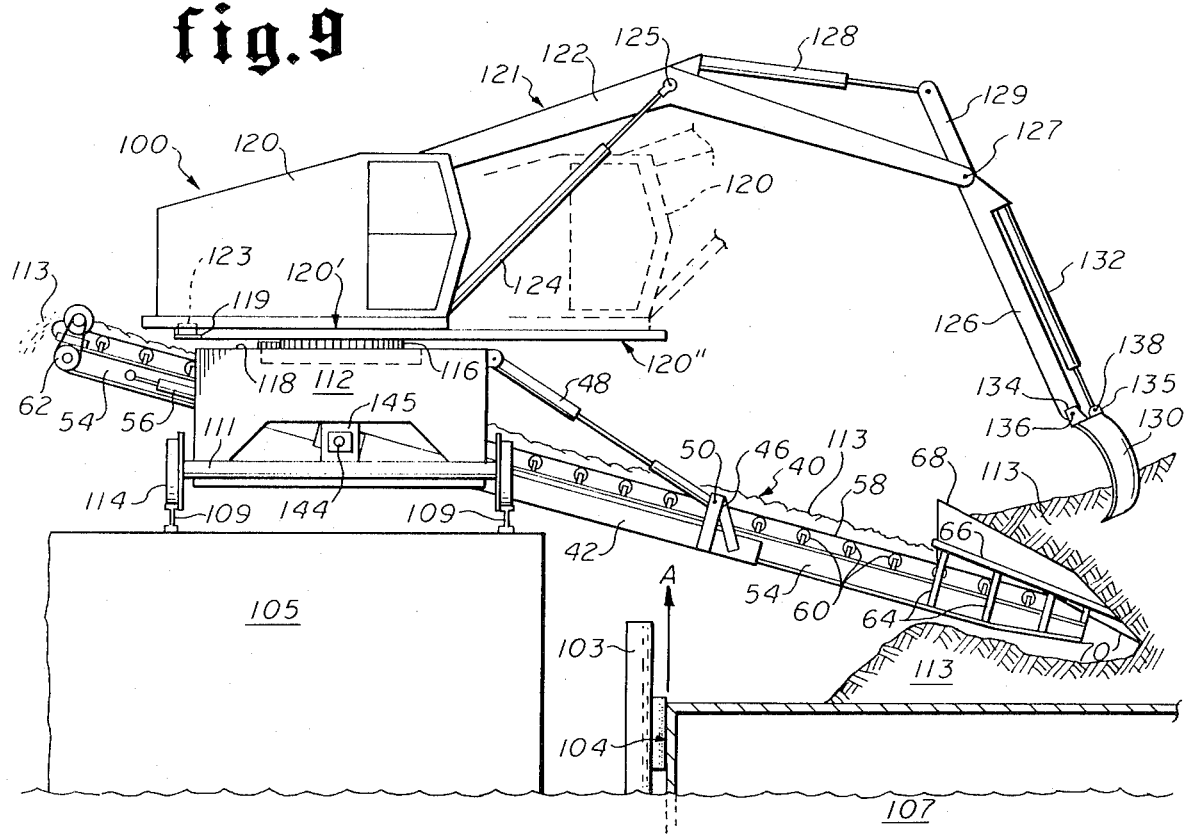

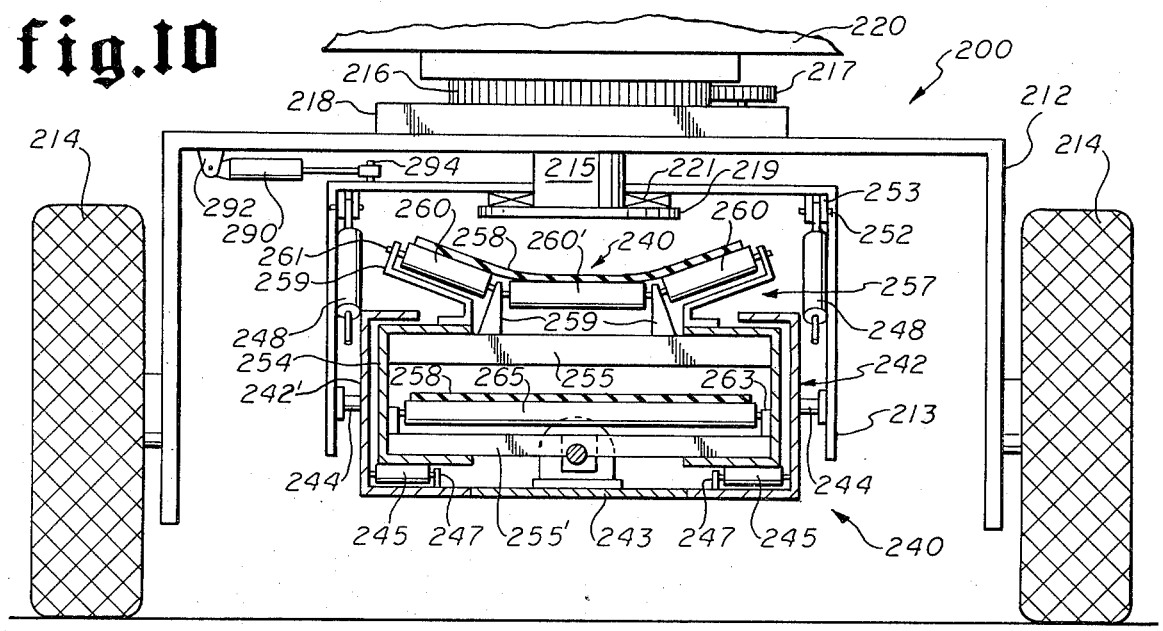
fig.10
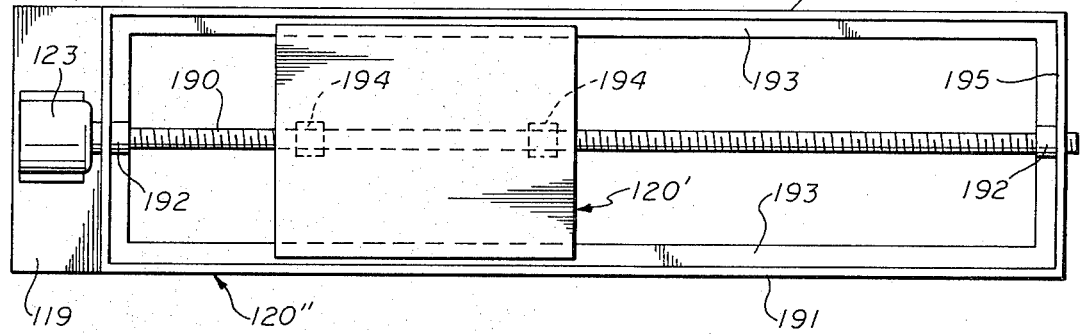
fig.11
fig.12
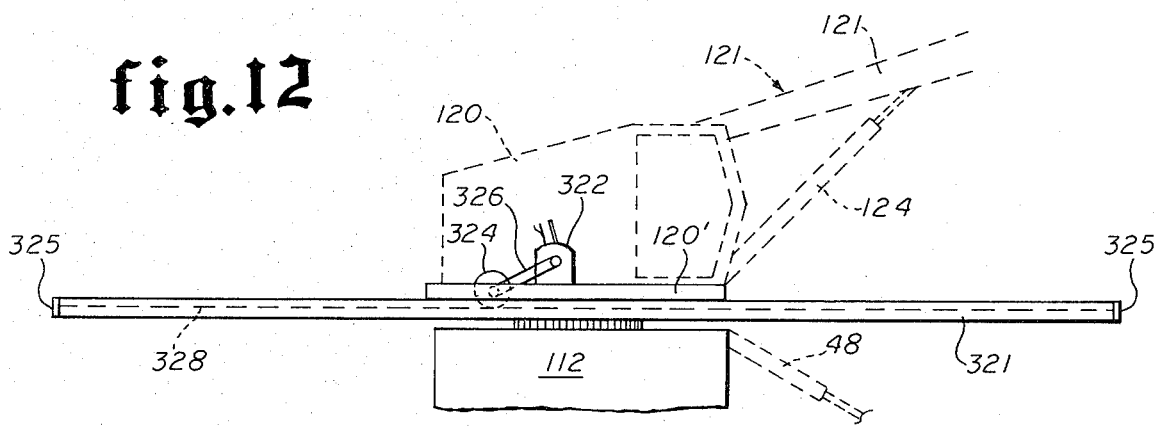

COMBINATION HANDLING AND CONVEYING APPARATUS

BACKGROUND OF THE INVENTION

This invention relates to apparatus for excavating, handling and loading materials. More particularly, the invention relates to a handling and loading apparatus carrying a longitudinally extendable conveyor for loading materials forward of the apparatus onto the conveyor for removal rearwardly of the loading apparatus.

In excavating and handling topsoil, sand, gravel, aggregates, coal, and crushed ores and the like, including bulk stored grains, it is generally necessary to load and move large volumes of such material and excess time and motion wasted in loading such material greatly adds to its cost of production and handling. In addition, it is difficult to unload such materials, or other similar unconsolidated granular materials, from vessels such as ships or barges from a dock which is generally at a higher elevation than the deck of the vessel. In addition, the edge of the dock limits forward movement of the loading means and thus limits accessibility to the vessel.

The known prior art includes draglines, bulldozers, cranes, bucket excavators and front-end loading machinery for scooping up and loading such material into a fixed conveyor system or into another vehicle such as a truck or rail-car for transportation. Self-propelled excavating and conveying machines have been utilized as exemplified by the apparatus disclosed in U.S. Pat. Nos. 2,366,480 (Beckwith); 2,384,242 (Fitch); 2,518,964 (White); 3,206,048 (Weiss); 3,241,693 (Stroker); 3,517,840 (Schneider); 3,547,287 (Cunningham); and 3,720,331 (Kamner).

However, all of such prior art utilizes scoops and buckets to pick up and load the material onto a conveyor system or other vehicle for transport. None of the prior art in the above-recited patents that utilize built-in conveyor systems discloses a conveyor apparatus utilizing a conveyor system that is maneuverable forward of the apparatus both longitudinally and in limited arcuate vertical movement to emplace the loading end of the conveyor in any desired position in contact with the material at differing levels, even below the level of the apparatus itself, in order that a handling means mounted on the apparatus can continuously move material onto the loading end of the conveyor. Such continuous loading without the necessity of the bucket or shovel to lift the material and swing it to a second position to unload the material can save a considerable amount of time in handling such materials.

Accordingly, one primary feature of the present invention is to provide a handling and conveying apparatus carrying a longitudinally extendable conveyor assembly that is also adapted for limited arcuate vertical movement.

Yet another feature of the present invention is to provide a conveyor means having a loading end positionable longitudinally and vertically forward of the apparatus in contact with the material to be moved for facilitating direct loading of the material.

Yet another feature of the present invention is to provide an articulated boom carrying a blade that is positionable forward of the apparatus to cooperate with the movable loading end of the conveyor above described in order to provide nearly continuous loading of the material onto the loading end of the conveyor with a minimum of lost motion.

Still another feature of the present invention is to provide means of moving the boom and handling means and/or the conveyor means forwardly of the apparatus to increase the reach of the apparatus from a fixed location.

SUMMARY OF THE INVENTION

The present invention remedies the problems of the prior art by providing an apparatus for handling and conveying material, by providing a vehicle that includes the above mentioned features. In accordance with one principle of this invention, an apparatus for handling and conveying material is disclosed comprising a chassis adapted for at least limited lateral movement, means for moving the chassis, longitudinally extendable conveyor means attached to and supported by the chassis and adapted for limited vertical arcuate movement with respect thereto, the conveyor means having a loading end projecting forwardly from the chassis and a discharge end projecting rearwardly from the chassis, the loading end movable longitudinally and arcuately to a position forward of the chassis and into contact with the materials, a platform rotatably mounted on the chassis in a position above the conveyor means, means for horizontally rotating the platform with respect to the chassis, an articulated boom means mounted on the platform for rotation therewith and having a free extending end, and handling means attached to the free extending end of the boom means and cooperating with the loading end of the conveyor means for continuously moving the materials unto the conveyor means.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 8 is a partial detail side view of the side mounted conveyor system shown in FIG. 7.

FIG. 9 is a side elevation of a third embodiment of the handling and conveying apparatus according to this invention.

FIG. 10 is a partial front elevation and vertical cross-section of yet another embodiment of the handling and conveying apparatus in which the conveyor system is also mounted for limited horizontal arcuate movement.

FIG. 11 is a top partial detail view of one drive means for moving the boom platform horizontally in the embodiment of FIG. 9.

FIG. 12 is a partial side detail view showing a cable/-winch apparatus for laterally moving the boom platform in another embodiment of FIG. 9.

DETAILED DESCRIPTION OF THE PREFERRED EMBODIMENTS

Figure 1:
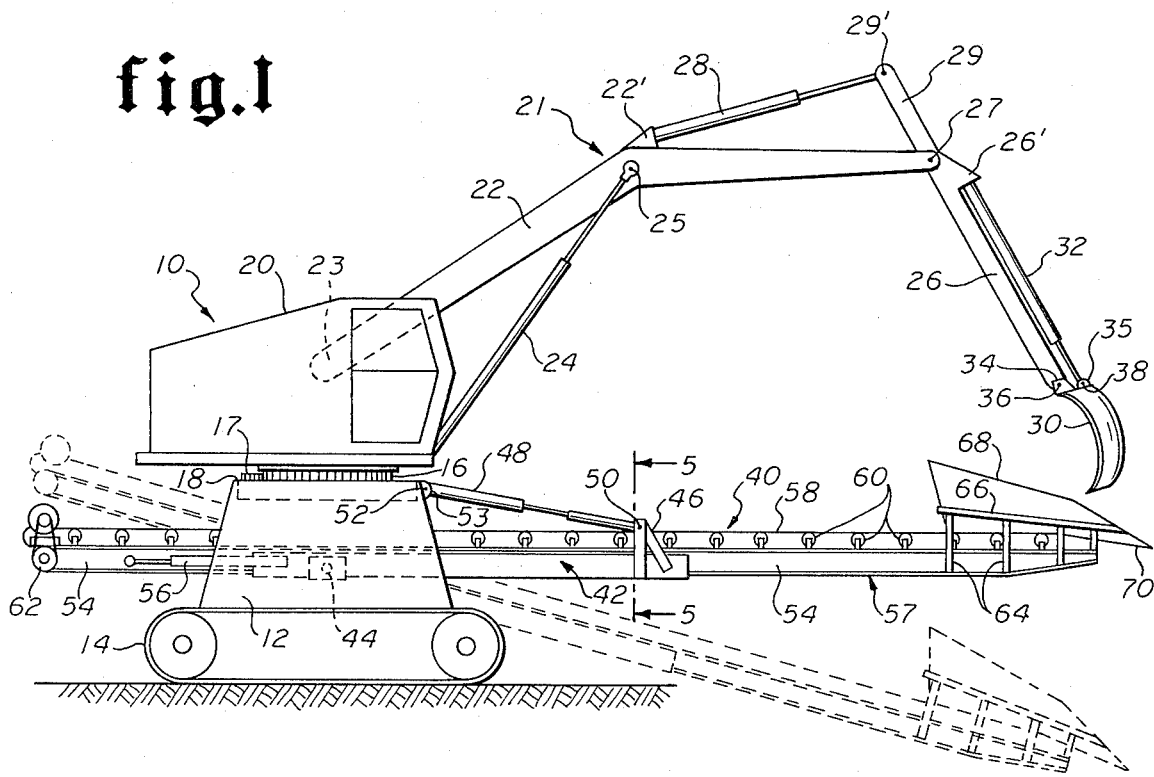
FIG. 1 is a side elevation of one embodiment of the handling and conveying apparatus according to the present invention.

Referring now to FIGS. 1, 2, 3, 4 and 5, a preferred embodiment of the handling and conveying apparatus 10 is shown. The apparatus 10 comprises a generally inverted U-shaped chassis 12 of conventional design for an excavator, except that is is much "higher" or has a greater ground clearance, to accommodate the underslung conveyor assembly 40. The apparatus uses a chassis 12 of the "crawler" type of self-propelled vehicle utilizing an endless track 14 driven by a motor (not shown) in a conventional manner. A platform 20 (including a vehicle "cab" for an operator) is mounted for rotation with respect to the chassis 12 in a conventional manner by means of a gear 16 driven by a pinion gear 17. The motor for driving pinion gear 17 is not shown, but can be of conventional hydraulic or electrical design. The gear 16 and necessary supporting plate (not shown) are mounted for rotation in a conventional manner in the top surface 18 of chassis 12.

A conventional type articulated boom assembly 21 is hinged to the structure of platform 20 for limited vertical arcuate movement for performing the necessary excavating and scooping movements. Boom assembly 21 includes a first boom section 22 hinged at end 23 to the platform structure 20 and supported and actuated by a pair of main hydraulic cylinders 24 attached conventionally by means of pivot pins 25. A second boom member 26 is hinged to the first boom member 22 by hinge pin 27 with an upper end 29 extending above first boom member 22. A hydraulic cylinder 28 is attached to member 22' of boom member 22 and pivotally attached to the extremity of end 29 of boom member 26 by means of a hinge pin 29. Boom member 26 thus is adapted for moving arcuately about hinge pin 27 with respect to the first boom member 22.

Figure 2:
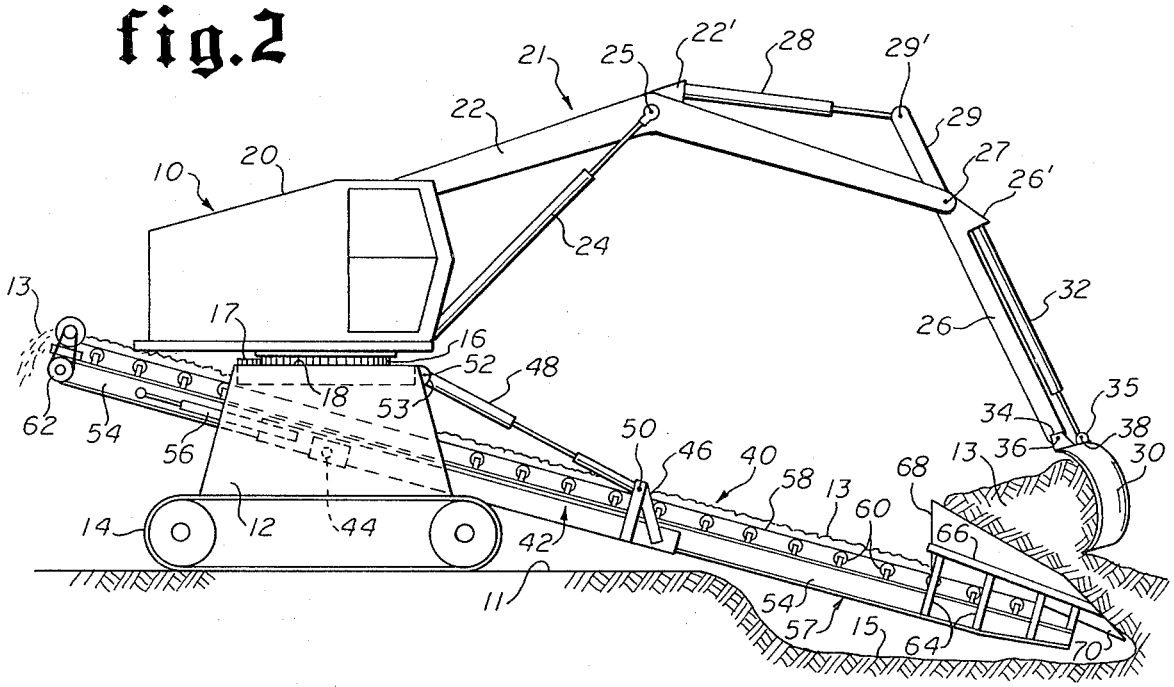
FIG. 2 is a side elevation of the self-propelled handling and conveying apparatus of FIG. 1 shown loading material at a level below the level of the apparatus onto the conveyor.
Figure 3:
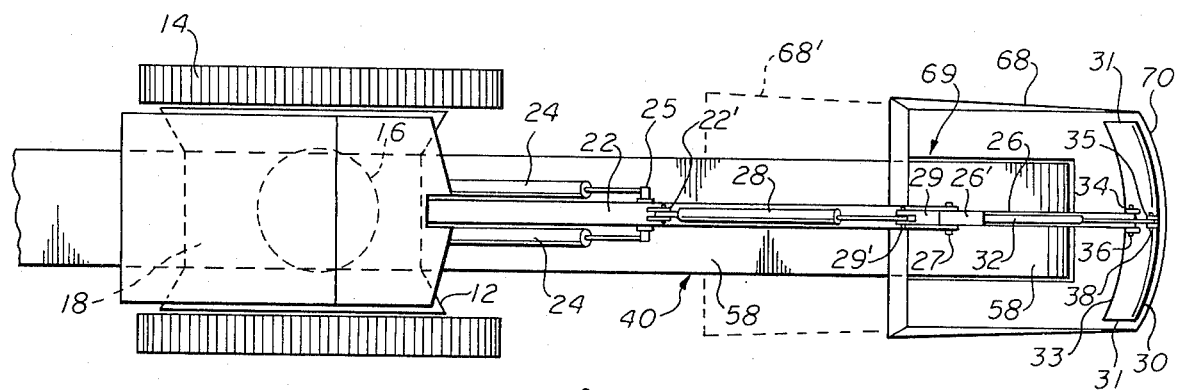
FIG. 3 is a top plan view of the apparatus shown in FIG. 1.

A handling means 30 is hinged to the lower end of the second boom member 26 by means of hinge pin 36 and mounting lugs 34 disposed on the handling means 30. A hydraulic cylinder 32 is disposed between member 26' of boom member 26 and lugs 35 disposed centrally of means 30 and spaced adjacent to lugs 34. The piston of cylinder 32 is pivotally mounted to lugs 35 by means of pivot pin 38. The action of boom assembly 21 is conventional in that cylinders 24, 28 and 32 co-act to articulate boom members 22 and 26 and the handling means 30. In the view of FIGS. 1, 2 and 3, the handling means 30 is shown preferably as a curved "scooping" blade. However, a bucket could also be used as can any other design of a means for continuously moving the material unto the conveyor.

Figure 5:
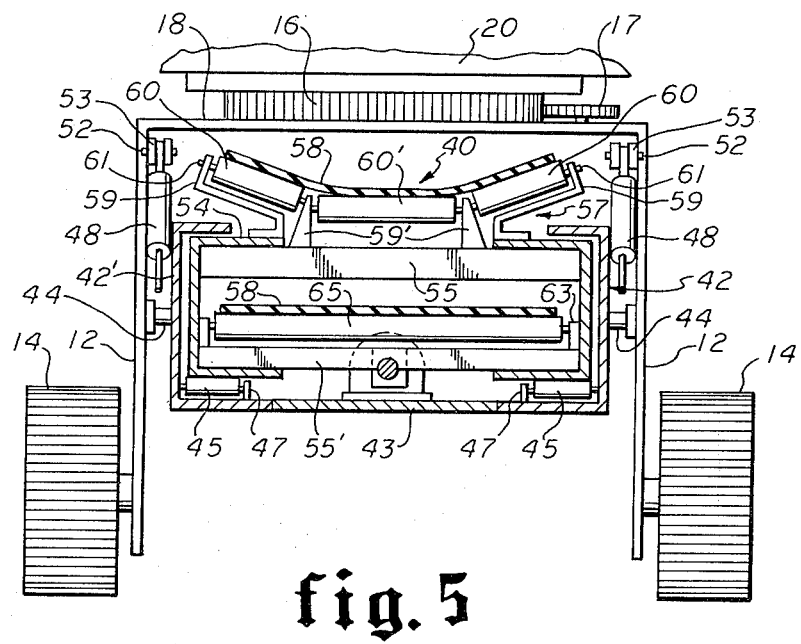
FIG. 5 is a vertical cross-sectional view of the conveyor taken along lines 5—5 of FIG. 1.

A conveyor assembly 40 is slung under platform 20 and the top surface 18 of chassis 12 and is supported for limited vertical rotational movement about axles 44 fixed to chassis 12 and journaled to the conveyor cradle 42 as shown in FIG. 5. Bracket members 46 are attached to the forward ends of cradle 42 and extend upwardly therefrom. A pair of conveyor tilting hydraulic cylinders 48 are attached pivotally to lugs 53 on chassis 12 by pins 52 and to bracket member 46 by pins 50. Cylinders 48 are operable to lower or raise the loading end of conveyor assembly 40 to a position into intimate contact with the material being handled.

Cradle 42 includes channel-type side rails 42' and a cross-bracing 43 welded to the spaced apart rails 42' to provide structural strength and rigidity. Disposed longitudinally within cradle 42 is a generally rectangular conveyor structure 57 comprising side frame members 54 and structural cross-frame members 55 and 55' (See FIG. 5). Conveyor structure 57 is mounted within cradle 42 for coaxial longitudinal movement with respect thereto as will be hereinafter further described. A pair of hydraulic cylinders 56 are attached rearwardly between cradle 42 and the rear end of structure 57 to provide a moving means for limited longitudinal movement of conveyor structure 57 with respect to cradle 42.

Bracket and frame members 64 and 66 are fixed to the forward extending ends of frame members 54 to support a shallow, generally rectangular material-receiving bin or hopper 68. The forward end of hopper 68 terminates in a generally flattened edge 70. Bin 68 has a generally rectangular opening 69 centrally disposed therein to receive the conveyor belt 58 that traverses the length of the conveyor structure 57. Conveyor belt 58 may preferably be of the "trough" type of conveyor and is supported by a plurality of rollers 60 and 60' spaced along and attached to frame members 54 and 55 (See FIG. 5). A motor drive 62 drives the endless conveyor belt 58 to move material from bin 68 for discharge rearwardly of apparatus 10.

As may be seen in greater detail in FIG. 5, the conveyor cradle 42 is hinged by means of axles 44 for limited vertical arcuate movement with respect to chassis 12. Cradle 42 is generally a rectangular box-like structure (as previously described), open on opposite, longitudinal ends. Pairs of spaced rollers 45 are mounted on base 43 by means of brackets 47 adjacent the side walls 42' and longitudinally spaced the length of cradle 42 (See FIG. 5). The spaced side rails 54 of conveyor structure 57 are disposed on the longitudinally disposed rollers 45 for permitting longitudinal movement of structure 57 along the rollers for the purpose hereinabove described. Roller brackets 59 and 59' are attached to the frame members 54 and/or 55 and project upwardly therefrom to support a trio of rollers 60 and 60' by means of pins 61 in a conventional manner to form a "trough" type conveyor having a generally shallow U-shaped cross-section for supporting belt 58. In addition, rollers 65 may be disposed between brackets 63 and rails 54 in the space between cross-braces 55 and 55' to provide support for the return portion of the conveyor belt 58.

As shown in FIG. 2, the apparatus 10 is positioned on a first ground level 11 and the bin 68 of conveyor assembly 40 positioned to contact earth materals 13 such as soil, sand, gravel or ore 13 located on another level 15. Conveyor assembly 40 may be positioned to place bin 68 at the desired height for easy moving of material 13 into the bin for transfer by the conveyor belt 58 to the rear of apparatus 10. Cylinders 56 may be used to extend or retract conveyor structure 57 with respect to cradle 42 as shown in FIG. 3, thereby moving conveyor bin 68 longitudinally with respect to boom assembly 21 as shown by the dotted lines.

Figure 4A:
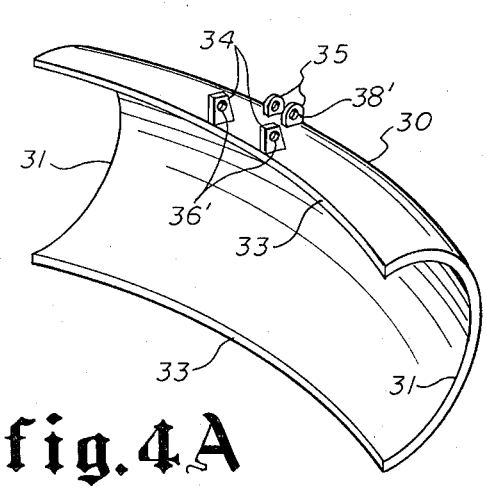
FIG. 4A is a perspective view of a loading blade for handling the material.
Figure 4B:
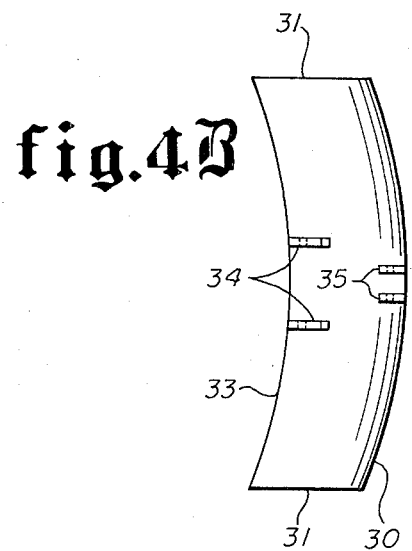
FIG. 4B is a top view of the blade shown in FIG. 4.

Of course, the apparatus 10 can use a conventional excavator scoop or bucket, however, it has been found preferable to use a wide curved blade 30, shown in greater detail in FIGS. 4A and 4B. Blade 30 is a generally curved, U-shaped metal blade having curved upper and lower edges 33 and U-shaped ends 31. A pair of boom mounting lugs or brackets 34 are fixed to the forward central area at the top of the blade and carrying mounting holes 36' for receiving pivot pin 36 for pivotally attaching blade 30 to the end of boom section 26. A second pair of lugs 35 are fixed to the blade outwardly of lugs 34 and carry holes 38' for receiving pivot pin 38 for pivotally attaching the piston rod of cylinder 32. Of course, other handling means 30 may be utilized as desired.

Figure 6:
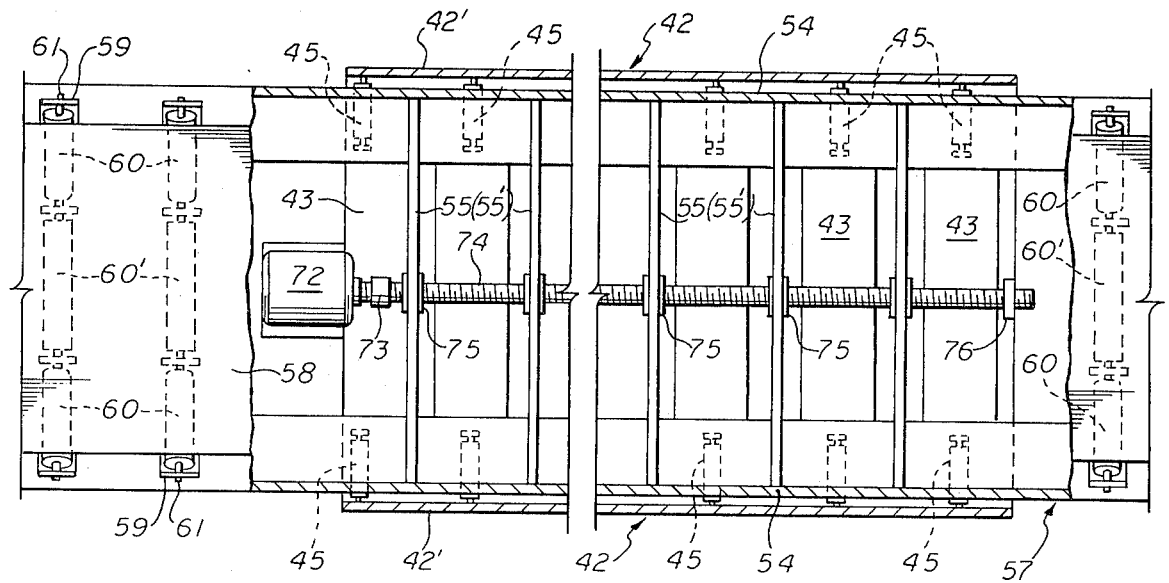
FIG. 6 is a partial detail view of the conveyor system utilizing another embodiment of a driving means to extend and retract the conveyor.

FIG. 6 shows another embodiment of a means of moving conveyor structure 57 with respect to conveyor cradle 42. In the partial top view shown in FIG. 6, the spaced side rails 54 and cross-braces 55 (55') are shown, with rails 54 adopted for longitudinal rolling movement with respect to cradle 42 on the spaced, opposed pairs of rollers 45. A motor 72, preferably an electric or hydraulic motor, is mounted on a cradle cross-brace member 43 and drives a threaded shaft 74 that may be coupled directly to motor 72 or driven through a suitable gear-box (not shown). Drive shaft 74 is supported and journaled in at least a pair of blocks 73 and 76 attached to frame members 43 of cradle 42. Shart 74 passes through threaded follower assemblies 75 attached to at least a pair of cross-braces 55' (See FIG. 5). When motor 72 is actuated to turn shaft 74 in one direction, the rotating screw threads engage the followers 75 and move conveyor structure 57 in a desired direction. When motor 72 is reversed, the rotation of threaded shaft 74 is reversed and drives the conveyor 57 in the opposite direction.

Figure 7:
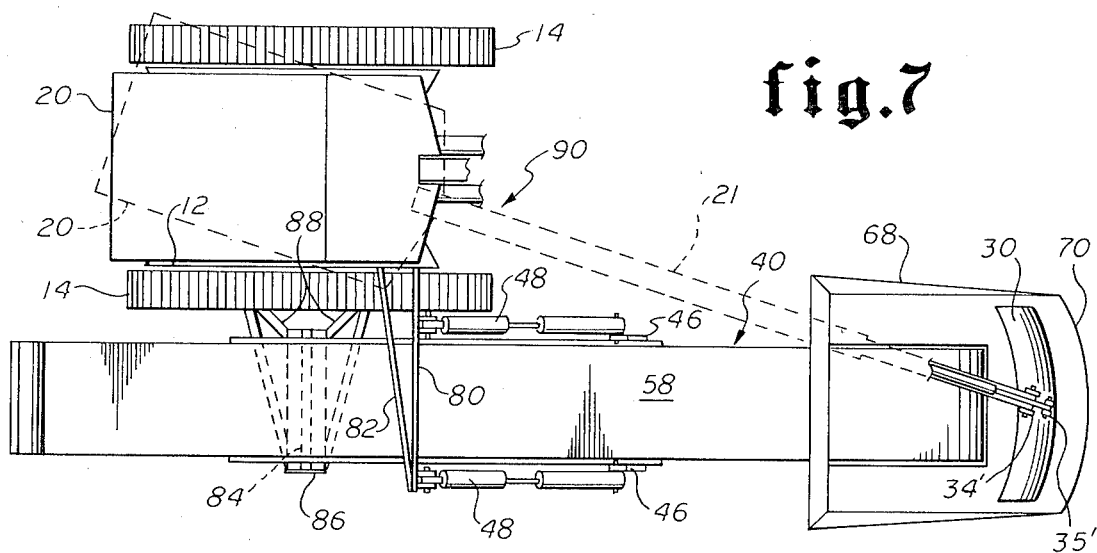
FIG. 7 is a top plan view of a second embodiment of the handling and conveying apparatus in which the conveyor is mounted on the side of the apparatus chassis.

Referring now to FIGS. 7 and 8, another embodiment 90 of the apparatus is shown. In embodiment 90 the crawler vehicle chassis 12 may be of more conventional height and design since the conveyor assembly 40 is mounted to one side of chassis 12. Platform and cab 20 are mounted for rotational movement on chassis 12 as hereinabove described for apparatus 10. However, projecting transversely from one side of chassis 12 are structural braces 88 supporting a projecting axle or beam 84. Conveyor cradle 42 is mounted for limited vertical rotational movement on axle or beam 84 by means of a bearing and shackle assembly 86. A transversely projecting bracket 80 and supporting brace members 82 are fixed to chassis 12 above track 14 and project transversely over the top of conveyor assembly 40. The conveyor vertical attitude adjusting cylinders 48 are attached at one end to bracket 80 projecting from chassis 12 and to the brackets 46 attached to cradle 42. The cab 20 and boom assembly 21 must be slightly rotated to the side to register blade 30 with receiving bin 68 for accepting loose material as hereinbefore described. It may be desirable to modify the mounting lugs 34 and 35 of blade 30 for setting them at an offset angle as shown at 34' and 35' in FIG. 7 and thereby enabling blade 30 to be offset at an angle with respect to boom assembly 21 for making it easier to scoop material longitudinally into bin 68.

One advantage of the side mounting of conveyor assembly 40 is that it can readily be mounted on an existing standard excavator chassis, and can be designed to permit greater downwardly arcuate movement of conveyor assembly 40 and receiving bin 68, since the rear clearance of the conveyor under chassis 12 is not a factor as it is in the embodiments shown in FIGS. 1–5.

FIG. 9 illustrates yet another embodiment 100 of the handling/conveying apparatus according to this invention. This embodiment is particularly suited for use on water-front docks 105 for off-loading granular material 113 from a vessel 104, such as a barge or the like, moored in water 107 to piling 103 at a level usually lower than dock 105 and laterally beyond the dock. In this embodiment, apparatus 100 includes a self-propelled vehicle having a chassis 112 mounted on axles 111 and propelled by wheels 114 on a pair of spaced rails 109 mounted on dock 105. Platform and cab 120 is mounted for rotation relative to chassis 112 by means of a gear arrangement 116, as previously described for other embodiments, mounted in the top 118 of chassis 112. Cab 120 is also mounted for limited horizontal movement with respect to chassis 112 by means of a base 120' that is adapted for movement with respect to a sled 120". A motor 123 for actuating and moving base 120' with respect to sled 120", as will hereinafter be further described, is mounted on a bracket 119.

The construction and operation of boom assembly 121 is identical to that of boom assembly 21 previously described and will not here be further detailed. A conveyor assembly 40, identical to that previously described is mounted for limited vertical, arcuate movement with respect to chassis 112 by means of an axle 144 supported by axle support members 145 fixed to chassis 112.

In operation, apparatus 100 can move transversely along dock 105 on rails 109 to properly position conveyor 40 and blade 130 with respect to dock 105 and vessel 104. As previously described, and as best shown in FIG. 3, receiving bin 68 can be moved longitudinally by means of moving conveyor structure 57 with respect to cradle 42. In addition, cab 120, carrying boom assembly 121, can move horizontally toward vessel 104, to a position such as that shown by the dotted lines to further extend the reach and range of boom assembly 121 and the handling means 130. Blade 130 moves the loose, granular material 113 into bin 68 for movement along conveyor belt 58 and rear discharge from apparatus 100 as hereinabove previously described for apparatus embodiments 10 and 90. As vessel 104 is unloaded, the vessel rises in the water as shown at A and conveyor bin 68 must be adjusted to compensate for the change. The combination of the longitudinally positionable conveyor 40 and the longitudinally positionable excavator cab 120 and boom assembly 121, permit a greater degree of handling access and moving and loading flexibility than heretofore found in the prior art.

FIG. 11 illustrates in greater detail the means of moving cab base 120' with respect to sled 120" as above described with reference to FIG. 9. Sled 120" comprises a rectangular box-like structure having upright sides 191 and ends 195. Base members or rails 193 are disposed longitudinally adjacent sides 191 for providing a support and bearing surface for the cab base plate 120'. Base plate 120' is adapted to slide along rails or members 193 or to be supported thereon for rolling movement by suitable rollers (not shown), similar to that described with respect to rollers 45 of conveyor assembly 40.

Motor 123 is mounted on a bracket 119 that is attached to one end of sled 120" and drives a threaded shaft 190 journaled in bearing blocks 192 disposed at opposite ends 195. Fixed to the underside of base 120 are threaded follower blocks through which shaft 190 projects. As motor 123 rotates shaft 190 in one direction, the threaded follower blocks move along shaft 190 thus driving base 120 in a desired direction.

Of course, any other suitable means for moving cab 120 with respect to chassis 112 may be utilized, and another such embodiment is shown in FIG. 12. Vehicle cab 120 and attached articulated boom assembly 121 (partially shown in dotted lines) are carried by cab base 120' which is mounted on a rail structure 321 for longitudinal movement thereon. A wire cable 328 is centrally disposed between rails 321 and attached to opposite end frames 325. The cable 328 is wound about a cable drum 324 which is driven by a motor 322 by means of a chain or belt drive 326. When actuated, motor 322 rotates cable drum 324 in one direction, thereby moving cab base 120' with respect to the base frame 321. When the motor direction is reversed, the cable drum is rotated in the opposite direction and cab base 120' moves in the other direction to a desired position.

FIG. 10 illustrates yet another embodiment 200 of the apparatus according to this invention. The apparatus 200 comprises a wheeled or rubber-tired vehicle chassis 212 supported by rubber tires 214 driven by a conventional motor (not shown). A platform and cab 220 is rotatably mounted on chassis 212 by means of a gear 216 driven by a pinion gear 217 powered by a conventional power source (not shown) and mounted in a retaining ring 218.

A conveyor assembly 240 is mounted within a generally inverted U-shaped frame structure 213 by means of a pair of axles or pivot pins 244 fixed to cradle structure 242 that permit limited vertical arcuate movement of conveyor assembly 240 with respect to frame 213 and chassis 212. The details of construction and operation of the cradle 242 and conveyor structure 257 are identical to that of cradle 42 and conveyor structure 57 previously described, and will not here be further described.

Frame 213 is suspended from chassis 212 by means of a support column 215 depending from the central top portion of chassis 212 and is adapted for rotational movement on ring bearings 221 retained by flange 219 of column 215. If desired, the frame 213 may seat directly on flange 219 and the mating surfaces provide a bearing surface. An actuating cylinder 290 is attached to chassis 212 by means of a bracket 292 and to one side of frame 213 by means of pin 294. When actuated, cylinder 290 applies a lateral force to pin 294 (offset from the center of frame 213) which force is translated into rotational motion rotating frame 213 (carrying conveyor assembly 240) about support column 215. In this manner the conveyor assembly 240 may be rotated through a limited degree of horizontal arcuate movement in order to reposition the receiving bin 68 laterally of the center line through the vehicle. Of course, any other suitable means of providing limited horizontal rotational movement to conveyor assembly 240 with respect to chassis 212 may be utilized, if it provides for the ability of conveyor assembly 240 to also include limited arcuate vertical movement.

While the design of embodiment 200 is ideally suited for large scale handling and conveying vehicles used in mining, such a design would also be useful as another embodiment of the dockside material handler/conveyor shown in FIG. 9, and, of course, can be used for any of the other handling and conveying uses herein described.

Figure 13:
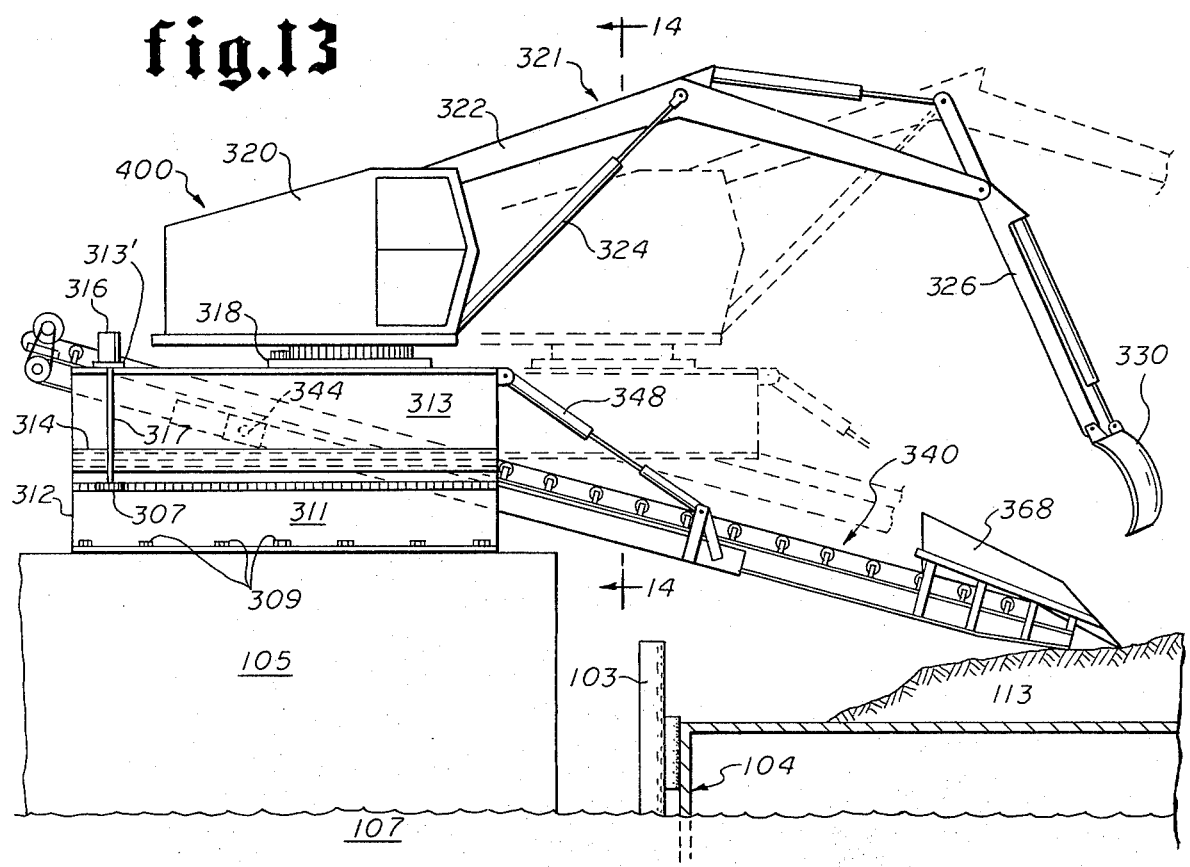
FIG. 13 is a side elevation of another embodiment of the handling and conveying apparatus according to this invention.
Figure 14:
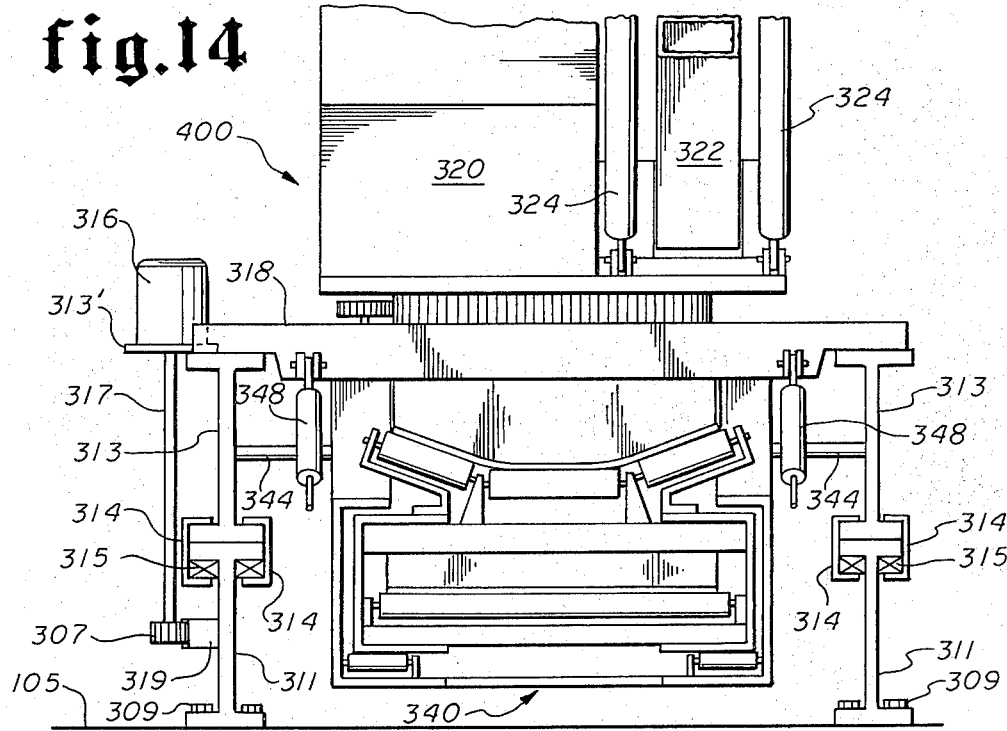
FIG. 14 is a partial front elevation and vertical cross-section of the apparatus taken along lines 14—14 of FIG. 13.

Referring now to FIGS. 13 and 14, another embodiment 400 of the excavator/conveyor apparatus according to this invention is disclosed. Apparatus 400 is particularly designed for use in unloading granular material 113 from water borne vessels, such as a barge 104, from a water-front dock 105. A base structure 312 comprises two pairs of stacked I-beams 311 and 313. The lower beam is rigidly attached to dock 105 such as by bolts 309. In practice the I-beams 311 and 313 could be massive and the I-beam webs could span four to six (4 to 6) feet. I-beam 313 is stacked vertically on beam 311 with the respective mating I-beam flanges providing a sliding bearing surface to allow beam 313 to slide longitudinally with respect to beam 311. The lower flange of beam 313 has attached longitudinally thereto channel retaining members 314 to form a "shoe" on the lower flange of beam 313 for engaging the upper flange of beam 311 and retaining the I-beams 311 and 313 in vertical alignment. In addition, rollers 315 or other bearing means may be provided to contact the lower edges of the top flange of beam 311 as shown if desired.

A platform and cab 320 and an articulated boom assembly 321 (including boom members 322 and 326) carrying a handling means 330, preferably a blade as hereinbefore described, are mounted for rotation in a conventional manner on a frame 318 spanning the pair of spaced beams 311 and 313 forming base structure 312. A conveyor assembly 340 is mounted for limited arcuate vertical movement by means of axles 344 mounted between the upper space beams 313. The conveyor carries a receiving bin or hopper 368 into which the material 113 upwardly and rearwardly of base structure 312 for dispensing the material. Since the boom assembly 321, including blade 330 and conveyor assembly 340, are constructed and function identically to boom assembly 21, blade 30 and conveyor assembly 40 hereinabove previously described, additional details of those assemblies will not herein be further discussed.

The pair of movable rails 313 with attached frame assembly 318 form a "chassis" for mounting the platform 320 and boom assembly 321 as hereinabove described. The "chassis" may be driven or moved with respect to he pair of fixed base rails 311 by any suitable propelling or moving means. One preferable moving means comprises a pair of motors 316 mounted on a bracket 313' and each driving a pinion gear 307 by means of a drive shaft 317 mounted for rotation in a bracket 305 extending outwardly from beam 313. The pinion gear 307 engages a rack gear element 319 fixed to each of the rails 311 for propelling the "chassis" (comprising rails 313 and frame 318) forward or rearward depending on the direction of rotation of the motor 316.

Blade 330 is used to push material 113 into conveyor bin 368 for moving the material 113 to the rear of apparatus 400. Bin 368 can be extended or retracted and moved up or down in a manner hereinbefore described to position the conveyor in the optimum position to receive material from blade 330. If the vessel 104 is too wide for the conveyor to reach when fully extended, then the operator can actuate the rail moving means and extend the chassis (upper beams 313 and frame 318) forwardly of beams 311 to a maximum extended position of approximately one-half the length of beams 311 and 313 as shown by the dotted lines. When beams 313 are driven forward as hereinabove described, the conveyor assembly 340, the platform and cab 320 and boom assembly 321 all move as an integral unit to extend the loading and conveying capability of apparatus 400 out from dock 105 and over the vessel 104 to aid loading.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An apparatus for off-loading and handling loose materials from a vessel, comprising
    a base structure,
    a generally inverted U-shaped chassis adapted for limited lateral movement with respect to said base structure, said chassis comprising
        a pair of spaced beams mounted for horizontal sliding movement with respect to said base structure,
        engaging means cooperating with said base structure and pair of spaced beams for engaging said base structure and pair of spaced beams and permitting said horizontal sliding movement of said pair of beams with respect to said base structure, and
        frame means attached to and spanning said pair of spaced beams for forming an upper frame structure,
    drive means for moving said chassis with respect to said base structure,
    a platform rotatably mounted on said upper frame structure of said chassis,
    means for horizontally rotating said platform with respect to said upper frame structure of said chassis,
    an elongated articulated boom means mounted on said platform for rotation therewith and for longitudinal extension beyond said chassis, said boom means having a free extending end,
    longitudinally extendable conveyor means suspended within said generally inverted U-shaped chassis below said platform and adapted for limited arcuate vertical movement with respect thereto, said conveyor means having a loading end projecting from said chassis and movable to a position in contact with the loose material for cooperating with said free extending end of said boom means, and
    material handling means disposed on said free extending end of said boom means and cooperating with said conveyor means loading end for loading the materials into said conveyor means.

2. The apparatus as described in claim 1, wherein said conveyor means comprises
    a generally rectangular cradle member disposed under said chassis,
    axle means disposed between said cradle member and said chassis for permitting limited arcuate vertical movement with respect to said chassis,
    a pair of hydraulic cylinders attached between said chassis and forwardly of said cradle member for rotationally moving said cradle member about said axle means,
    a conveyor assembly disposed longitudinally in said cradle member and cooperating therewith for permitting longitudinal movement with respect thereto, and
    driving means for moving said conveyor assembly longitudinally with respect to said cradle.

3. The apparatus as described in claim 2, wherein said driving means comprises a pair of hydraulic cylinders attached between the sides of said cradle and said conveyor assembly for moving said conveyor assembly longitudinally with respect to said cradle.

4. The apparatus as described in claim 2, wherein said driving means comprises
    a reversible motor mounted on said cradle,
    a threaded drive shaft driven by said motor, and
    follower means fixed to said conveyor assembly and engaging said threaded shaft for moving said conveyor assembly longitudinally with respect to said cradle when said motor is actuated.

5. The apparatus as described in claim 2, wherein said conveyor assembly has a projecting loading end and further includes a dish-shaped receiving bin attached to said loading end for cooperating with the conveyor for receiving the materials from said handling means and depositing the materials on said conveyor.

6. The apparatus as described in claim 1, wherein said handling means comprises
    a generally U-shaped longitudinally curved blade, and lug mounting means disposed on said blade for pivotal attachment to said free end of said boom means.

7. The apparatus as described in claim 1, wherein said conveyor means comprises
    a generally rectangular cradle member disposed in the space between said spaced means and under said upper frame,
    axle means disposed between said cradle member and said chassis for permitting limited arcuate vertical movement with respect thereto,
    a pair of hydraulic cylinders attached between said frame and forwardly of said cradle members for rotationally moving said cradle member about said axle means,
    a conveyor assembly disposed longitudinally in said cradle member and cooperating therewith for permitting longitudinal movement with respect thereto, and
    driving means for moving said conveyor assembly longitudinally with respect to said cradle.

8. The apparatus as described in claim 7, wherein said driving means comprises a pair of hydraulic cylinders attached between the sides of said cradle and said conveyor assembly for moving said conveyor assembly longitudinally with respect to said cradle.

9. The apparatus as described in claim 7, wherein said driving means comprises
    a reversible motor mounted on said cradle,
    a threaded drive shaft driven by said motor, and
    follower means fixed to said conveyor assembly and engaging said threaded shaft for moving said conveyor assembly longitudinally with respect to said cradle when said motor is actuated.

10. The apparatus as described in claim 7, wherein said conveyor assembly has a projecting loading end and further includes a dish-shaped receiving bin attached to said loading end for cooperating with the conveyor for receiving the materials from said handling means and depositing the materials on said conveyor.

11. The apparatus as described in claim 2 or 7, wherein said cradle member comprises
- a pair of elongated spaced channel members with the open channels of each member disposed in opposing relationship,
- a plurality of spaced structural brace members attached to said spaced channel members for rigidly holding said side members in said spaced opposing relationship, and
- bearing means disposed in the lower flange of each of said channel members.

12. The apparatus as described in claim 11, wherein said conveyor assembly comprises
- a pair of elongated spaced side members adapted for sliding longitudinal movement with said spaced channel members and engaging said bearing means,
- a first plurality of spaced brace members disposed transversely between said side members in said spaced relationship,
- a second plurality of spaced brace members disposed transversely between said side members and spaced below said first plurality of spaced brace members for leaving a longitudinal space therebetween, said first and second plurality of spaced brace members acting to rigidly hold said side members in said spaced relationship,
- a plurality of spaced roller bracket means mounted on said first plurality of spaced brace members and said side members and projecting upwardly therefrom,
- a plurality of conveyor rollers mounted for rotation on said roller bracket means,
- a plurality of spaced support rollers mounted for rotation between said side members in said space between said first and second plurality of brace members,
- an endless conveyor belt disposed over and supported by said plurality of conveyor rollers for carrying material, the return portion of said conveyor belt disposed over and supported by said plurality of support rollers, and
- means mounted on said brace members and said side members for driving said conveyor belt over said rollers.

* * * * *

UNITED STATES PATENT AND TRADEMARK OFFICE
CERTIFICATE OF CORRECTION

PATENT NO. : 4,379,672
DATED : April 12, 1983
INVENTOR(S) : Roy D. Hunter

It is certified that error appears in the above-identified patent and that said Letters Patent is hereby corrected as shown below:

column 5, line 40: delete "Shart" and insert --Shaft--;

column 8, line 40: add "d" to end of "space";

column 8, line 42: after "113" add --is scooped and then carried--;

column 8, line 53: delete "he" and insert --the--;

column 10, line 39: delete "means" and insert --beams--; and column 11, line 19: delete "with" and insert --within--.

Signed and Sealed this

Twenty-seventh Day of December 1983

[SEAL]

Attest:

GERALD J. MOSSINGHOFF

Attesting Officer

Commissioner of Patents and Trademarks